(Model.)
J. S. PARDEE & A. MORLEY.
NUT LOCK.
No. 283,506.    Patented Aug. 21, 1883.
Fig. 1.
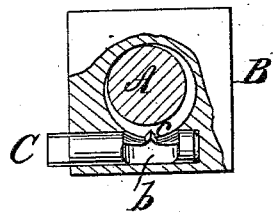
Fig. 2.
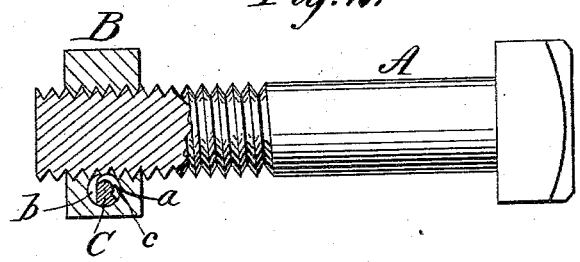
Fig. 3.                Fig. 4.
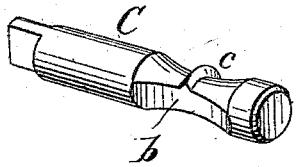    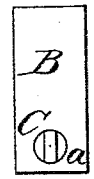
Fig. 5.
WITNESSES:
Donn Twitchell
C. Sedgwick
INVENTOR:
J. S. Pardee
A. Morley
BY
Munn & Co
ATTORNEYS.

UNITED STATES PATENT OFFICE.

JOEL S. PARDEE AND ALBERT MORLEY, OF NEW TROY, MICHIGAN.

NUT-LOCK.

SPECIFICATION forming part of Letters Patent No. 283,506, dated August 21, 1883.

Application filed January 22, 1883. (Model.)

*To all whom it may concern:*

Be it known that we, JOEL S. PARDEE and ALBERT MORLEY, both of New Troy, in the county of Berrien and State of Michigan, have invented certain new and useful Improvements in Nut-Locks, of which the following is a full, clear, and exact description.

This invention relates to certain improvements in Letters Patent No. 127,359, granted to Albert Morley, May 28, 1872; and it consists in making the lateral lip or stud on the locking-key slightly eccentric, whereby it will have a binding or wedging action when the key is turned for locking the nut, that will take up the unavoidable play of the nut on the bolt and of the key in the recess of the nut, and thus prevent all loosening or turning back of the key.

Reference is to be had to the accompanying drawings, forming part of this specification, in which similar letters of reference indicate corresponding parts in all the figures.

Figure 1 is a plan view of our improved nut, partly broken away to show its construction. Fig. 2 is a sectional view of the nut applied to a bolt, the latter also partly in section. Fig. 3 is a perspective view of the locking-key. Fig. 4 is a side elevation of the nut, and Fig. 5 is a transverse sectional elevation of the locking-key.

A represents an ordinary bolt. The nut B is formed with the hole or recess $a$, the same as shown and described in the above-mentioned patent, and the locking-key C is formed with the concavity $b$ and lip or stud $c$, the same as in said patent, except that the stud is made slightly eccentric on its outer sharp edge, as shown clearly in Figs. 2, 3, and 5, instead of concentric, as in said patent.

The objection to the concentric form of the stud is that when the key is turned in the recess $a$ for locking the nut the initial contact of the stud with the thread of the bolt will cut so deep a notch in the thread that the key is liable to work loose and turn back in the recess and unlock the nut. By making the stud eccentric this objection is overcome, since the notch in the thread of the bolt will be cut deeper and deeper as the key is turned, which will take up any play of the nut on the bolt and of the key in the recess $a$ by a wedging action, and at the same time bind the key in the recess $a$, so that it will not jar loose nor turn back. In this manner the lock is made perfectly secure and reliable.

Having thus described our invention, we claim as new and desire to secure by Letters Patent—

1. As a new article of manufacture, a nut for bolts, provided with the adjustable locking-key C, formed with the eccentric lip or stud $c$, substantially as described, and for the purposes specified.

2. The key C, for locking nuts upon bolts, constructed with the concavity $b$, and the eccentric lip or stud $c$, substantially as and for the purposes set forth.

JOEL S. PARDEE.
ALBERT MORLEY.

Witnesses:
HARRY C. NIXON,
NETTIE SHERWOOD.